Figure 1:
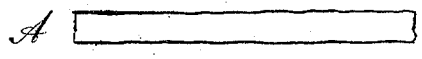
Figure 1:
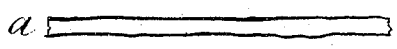

W. Beschke,

Piston Packing.

No. 99,627.  Patented Feb. 8, 1870.

A a

C c

E e

M m

Witnesses: V. Clayton, J. G. Clayton

Inventor: William Beschke.

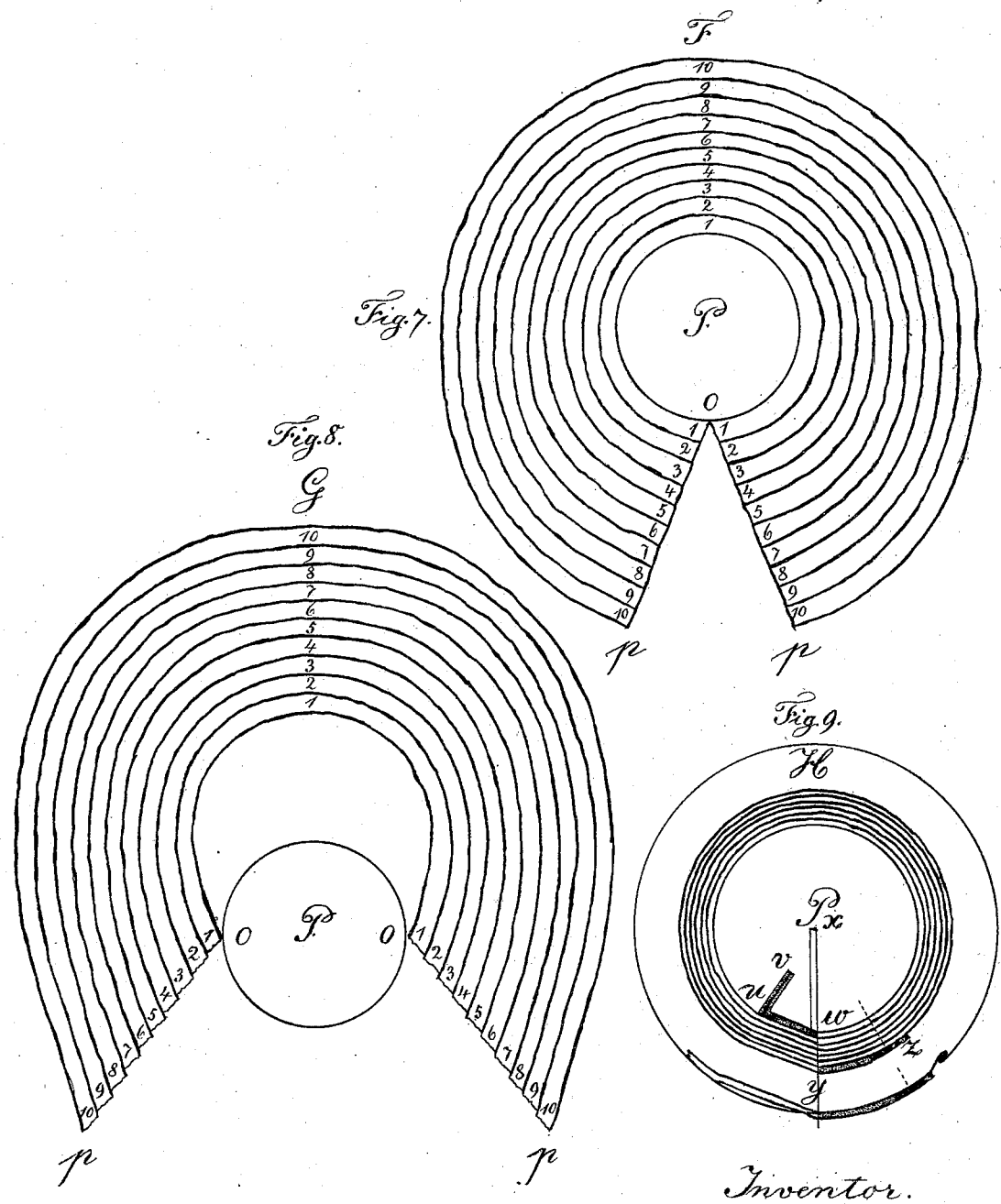

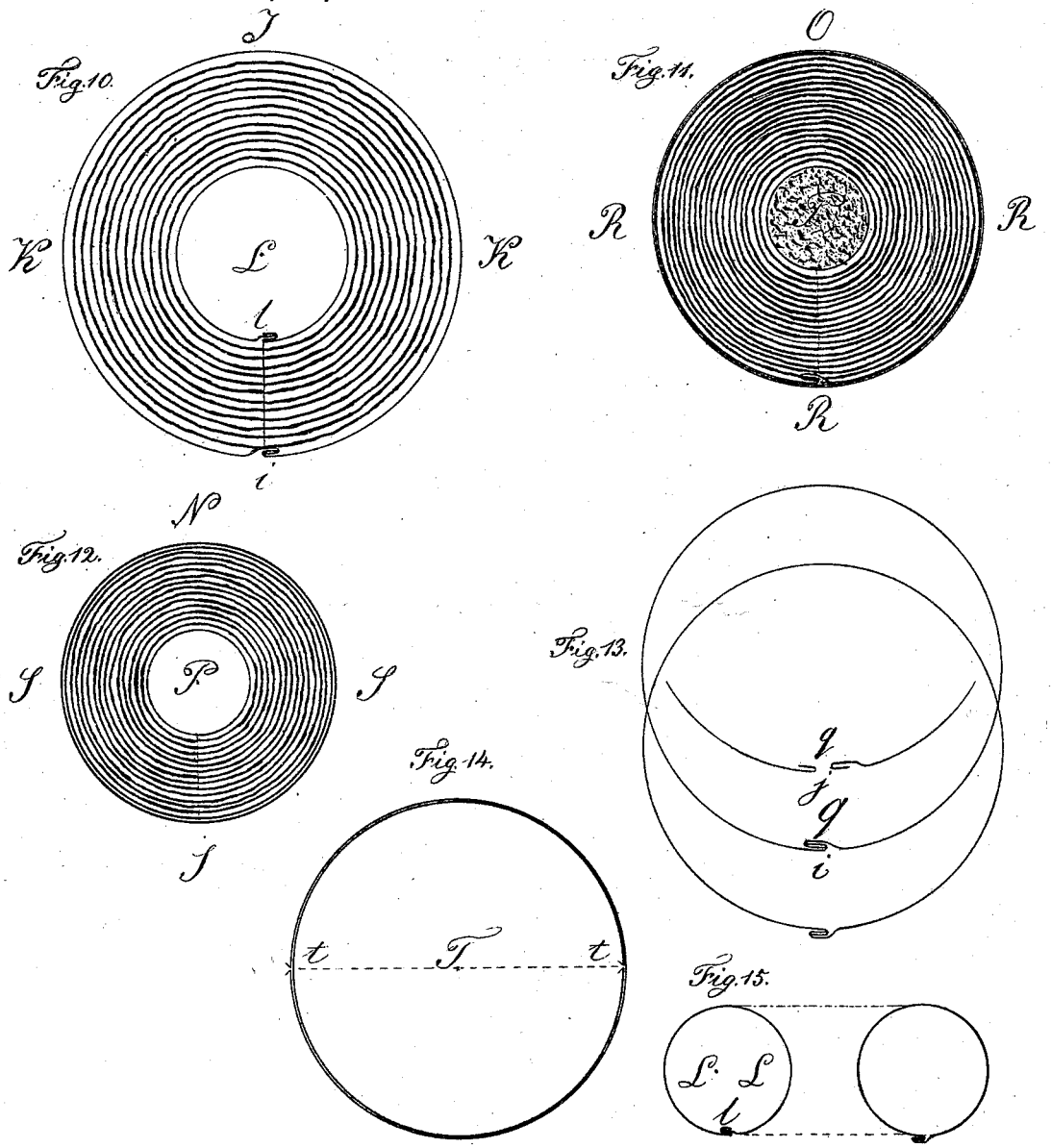

United States Patent Office.

WILLIAM BESCHKE, OF PHILADELPHIA, PENNSYLVANIA.

Letters Patent No. 99,627, dated February 8, 1870.

---

IMPROVEMENT IN PACKING FOR STEAM-ENGINES, PUMPS, &c.

---

The Schedule referred to in these Letters Patent and making part of the same.

---

*To all whom it may concern:*

Be it known that I, WILLIAM BESCHKE, of the city of Philadelphia, in the county of Philadelphia, and in the State of Pennsylvania, have invented an Improved Method of Preparing ordinary Fibrous Materials, in Flat Layers, for Packing-Purposes in Steam-Engines, Pumps, and other Similar Contrivances, and, also, of adapting them in flat layers to any shapes and sizes, and, likewise, of preserving their shapes and sizes for transportation and use; and I do hereby declare that the following is a full, clear and exact description thereof, reference being had to the annexed drawings, and to the letters of reference marked thereon.

The nature of my invention consists—

First, in making a chemical compound, to be used, not as a lubricant, but as a partly adhesive agent, by saturating with it ordinary fibrous materials, in flat layers, to increase the adhesiveness of their fibres, and to aid in preserving it.

Second, in reducing, by mechanical compression, in combination with the adhesive agency of that compound, the elasticity and the thickness of such fibrous materials, in flat layers, and in thus increasing their density, and making them mouldable or plastic, and adaptable to any shapes and sizes.

Third, in adapting, by a certain mode of operation, such prepared fibrous materials, in flat layers, to any shapes and sizes, for packing-purposes.

Fourth, in preserving the shapes and sizes of such prepared and adapted fibrous materials, by enclosing them tightly in easily-joined and disjoined hoops or cylinders, which correspond with the shapes and sizes of the receptacles intended to be packed with those materials.

Fifth, in making and using such hoops or cylinders, as a principal part of my invention, to preserve the shapes and sizes of such prepared and adapted fibrous materials, for transportation and use in packing pistons, piston-rods, &c., of steam-engines, pumps, and other similar contrivances.

To enable others skilled in the art to make and use my invention, I will proceed to describe its construction and operation.

First, I dissolve or distribute one part (by weight) of common wax, or any solvable equivalent of it, having chemical affinity with lubricants, in four parts (by weight) of benzine, or any solvent equivalent of it, which benzine is produced from the distillation of petroleum. I heat that compound to about 150° Fahrenheit, and I put into it ordinary fibrous materials, in flat layers, and let them become well saturated with it. Then they are taken out and slightly pressed, to remove the superabundant compound from them, and dried till the benzine be evaporated, while the dissolved or distributed wax is left, as an adhesive agent, sticking to the fibres of the materials, to make them mouldable or plastic, and to aid in preserving them in reduced thickness, when compressed and adapted to shapes and sizes for packing.

Second, I cause the separate layers of those so saturated and dried fibrous materials to be powerfully compressed between cold, hard, smooth, and straight parallel cylinders or rollers, and thus reduced in elasticity and thickness, but increased in density; then to be so preserved by heavy or powerful compressions between two cold, hard, smooth, and straight plates, till they shall be adapted to shapes and sizes for packing.

Figure 2:
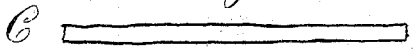
Figure 2:
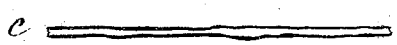
Figure 3:
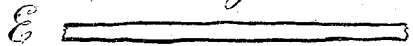
Figure 3:
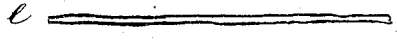
Figure 4:
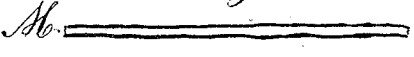
Figure 4:
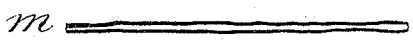
Figure 4:
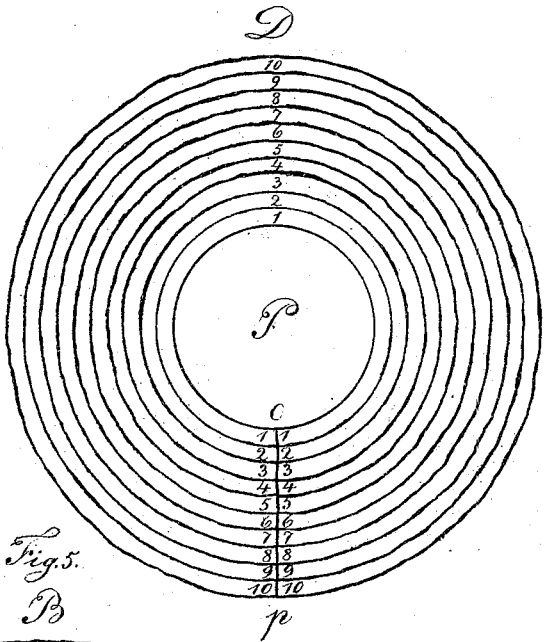
Figure 4:
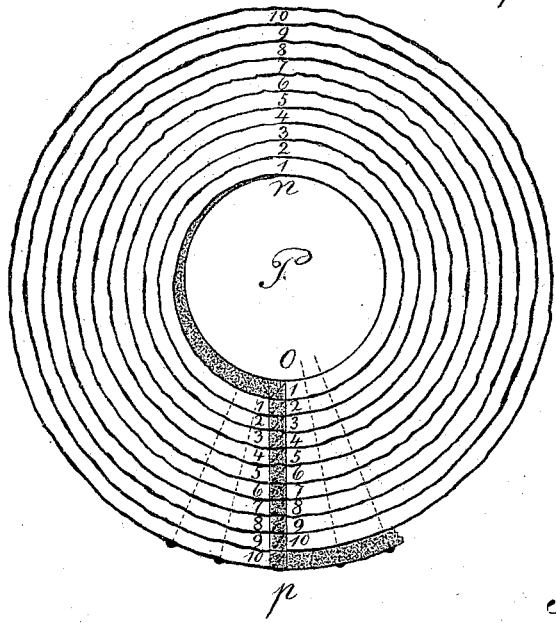

Third, I adapt to any required shape and size each flat layer or strip of chemically-prepared and mechanically-compressed fibrous material, of which samples or specimens are given and represented in Figure 1, by A, fourfold in usual condition, by $a$, the same prepared and compressed; in Figure 2, by C, double, and also, as usual, by $c$, the same prepared and compressed; in Figure 3, by E, double, and, as usual, by $e$, the same prepared and compressed; in Figure 4, by M, single, and, as usual, by $m$, the same prepared and compressed; in which operation of adapting the the same to such purposes, I proceed as follows:

I take a fourfold layer or strip, prepared and compressed, and I wind it tightly in volute form around a cylinder, as represented in Figure 5, by B, which shows ten windings, 1–1, &c., to 10–10, &c., from $n$ $o$ to $p$ $s$, the cylinder P representing a piston-rod to be packed with that strip, which must be nearly ten feet long from $n$ to $s$, being tapered from $o$ to $n$, where its windings begin, whose ends are at $p$ and $s$, $p$ being the real one, and $s$ the additional one, both to be fastened to the other windings by four rows of long and strong pins, two rows on the left of $p$ going through ten thicknesses, and two rows on the right of $p$ going through eleven thicknesses, and being driven a little into the wooden cylinder P.

By two cuts, with a sharp and thin knife, through the eleven thicknesses of the ten windings 1–1, &c., to 10–10, which cuts must be made from $p$ to $o$, they are separated into ten corresponding parts, parallel to and with each other. Then the tapered end $n$ $o$ of the strip, that portion of the windings between the two cuts from $p$ to $o$, and that of their end from $p$ to $s$, are as waste material, (represented in fig. 5, by $n$ $o$ $p$ $s$, shaded,) carefully taken away, without disturbing or unshaping the other parts of the volute, which is then, at last, tightly pressed from B toward $p$, around the cylinder P, from $n$ to $o$, so that the ends 1, &c., to 10, on the left of $o$ $p$, moving at an angle of forty-five degrees, to the ends 1, &c., to 10, on the right of $o$ $p$, join them, and they break joints with each other.

Thus the volute, represented in fig. 5, by B, with ten parallel windings, 1, &c., to 10, is transformed to ten concentric parallel cylinders, 1, &c., to 10, as represented in Figure 6, by D, with one common joint $o\ p$, all chemically adhering to each other, but exposed, and subjected to be eventually expanded and misshaped, if they are not tightly enclosed.

As represented in Figure 7, by F, with the opened joint $o\ p\ p$, it shows the eventual expansion of misshaped, compressed, and adapted material not tightly enclosed, which is in Figure 8, by G, with the still more opened joint $o\ o\ p\ p$, represented as being put across or over a piston-rod, P.

As it would be impossible, or, at least, very difficult, even with much labor and great trouble, to restore the shape and size of such material so misshaped and expanded, I have invented the following additional improvement, represented in fig. 9. by H.

The wooden cylinder, as the piston-rod P, has two grooves, $u\ v$ and $w\ x$. With one single strip of chemically-prepared and mechanically-compressed material, I make a volute of six windings from $w$ to $y$, its internal end having been doubled and pressed with a dull and thin knife into the groove $u\ v$, so that the strip can be very tightly wound around the cylinder. Thereupon the other end is well fastened to the cylinder by two or more rows of strong pins, as shown in fig. 9, by $z$. The windings of the volute may be, as there indicated, continued at liberty to any required thickness. Nine-tenths of these windings around the cylinder or piston-rod P, from $w$ to $u$, are parallel with its circumference, and concentric with its axis $x$, while one-tenth of them, between $u$ and $w$, are not so, but running straight from $u$ to $w$, deviating from its circumference and axis by one thickness of the strip, as shown between $w$ and $y$. Instead of two cuts through the aggregate thickness of the volute, as before described and represented in fig. 5, between $p$ and $o$, one cut is made through it, as represented in fig. 9, between $w$ and $y$, diverging from the axis $x$ of the cylinder $p$, to the external circumference of the finished volute. The ends $v\ u\ w$ and $y\ z$ of the strip being carefully taken off as waste material, by that one diverging cut, the volute gets one common joint, $w\ y$, for all its windings, and is thus transformed to as many parallel and concentric cylinders, like those represented in fig. 6, by D. But for such a cut, diverging from the axis $x$ of the cylinder P, the latter must have the groove $x\ y$, as represented in fig. 9. The fastening-pins must not be taken off before the adapted material is tightly enclosed, to preserve its shape and size, as follows:

Fourth, I preserve the shapes and sizes of my prepared, compressed, and adapted packing-materials, by tightly enclosing the latter, immediately after they have been so far finished, in hoops or cylinders, represented in Figure 10, by I K K, closed or joined at $i$, in which a small cylinder, L, (not closed, but only tangentially joined at $l$, so as not to get inwardly smaller by compression converging to the axis,) represents a piston-rod, surrounded by thirteen double layers of prepared, compressed, and adapted packing material, which is likewise represented in Figure 11, by O R R R, and in Figure 12, by N S S S, both having supposed piston-rods P, surrounded with such material, tightly enclosed in cylinders.

Fifth, I bend, in a peculiar way, the ends of hoops or cylinders, in which such materials shall be tightly enclosed, to preserve their shapes and sizes, so that these ends be firmly joined and easily disjoined, when and just before so enclosed materials shall be put around pistons and into cylinder of steam-engines, &c., or around piston-rods, and into packing-boxes, &c., their shapes and sizes having thus been preserved by such enclosing hoops or cylinders so firmly joined. Two such tightly-closed hoops or cylinders are used, as represented in fig. 10, by I K K, closed or joined at $i$, and is represented in Figure 13 by $q$, closed or joined at $i$, and by $q$, opened or disjointed at $j$, both to be done sideways or sidewise, not tangentially. The internal cylinder used, as represented in fig. 10, by L, ("not closed, but only tangentially joined at $l$,") is also represented in Figure 15, by L L, likewise "only joined at $l$," but enclosed in another cylinder or hoop, like that represented in fig. 13, closed at the joint.

A double and soldered cylinder, represented in fig. 11, by O R R R, is represented in Figure 14, by T, with two joints in juxtaposition to each other, one inside, and the other outside of the cylinder, and each marked $t$, the joints being a little open in the drawing, so as to be seen.

What I claim as my invention, and desire to secure by Letters Patent, is—

1. Fibrous material, saturated with the chemical compound herein described, for the purpose set forth.

2. The process, herein described, for preparing packing from fibrous materials, the same consisting in saturating them with adhesive substances, and applying mechanical pressure, as set forth.

3. The mode, herein described, for forming packing into suitable shapes for various purposes, as described.

4. The mode of putting up, for transportation, packing prepared by the process herein described.

5. The devices, herein described, for securing the several layers of packing in cylindrical form, as described.

6. The new article of packing, made by the several operations and processes herein set forth.

In testimony that I claim the above described improved method of preparing, &c., fibrous materials for packing-purposes, in steam-engines, &c., I have hereunto signed my name, this 30th day of June, 1869.

WILLIAM BESCHKE.

Witnesses:
T. G. CLAYTON,
WM. MARTIN,